United States Patent
Chiang (10) Patent No.: US 7,741,731 B2
(45) Date of Patent: Jun. 22, 2010

(54) PWM POWER REGULATOR DEVICE

(75) Inventor: Nan-Cheng Chiang, Sindian (TW)

(73) Assignee: Arico Technology Co., Ltd., Taipei Hsien (TW)

( * ) Notice: Subject to any disclaimer, the term of this patent is extended or adjusted under 35 U.S.C. 154(b) by 107 days.

(21) Appl. No.: 12/290,573

(22) Filed: Oct. 30, 2008

(65) Prior Publication Data

US 2010/0110740 A1 May 6, 2010

(51) Int. Cl.
*H05B 6/04* (2006.01)
(52) U.S. Cl. .................. 307/21; 219/660; 219/663
(58) Field of Classification Search ................ 307/154, 307/31, 21; 363/135; 219/660, 661, 663
See application file for complete search history.

(56) References Cited

U.S. PATENT DOCUMENTS 5,214,575 A * 5/1993 Sugishima et al. ............ 363/37

* cited by examiner

*Primary Examiner*—Shawn Riley
(74) *Attorney, Agent, or Firm*—William E. Pelton, Esq.; Cooper & Dunham LLP (57) ABSTRACT

A PWM power regulator device has a processor, an input interface circuit, a zero phase detecting circuit and a thyristor. The input interface circuit is connected to a PWM output terminal of an external digital control circuit and the processor. The processor calculates a period and duty cycle of a PWM signal from the PWM output terminal and then outputs a triggering signal to the thyristor. The thyristor is triggered at different conduct angle according to the triggering signal and the triggering signal is determined by the processor according to the PWM signal. Therefore, the power regulator device is directly connected to the PWM output terminal of the digital control circuit without digital to analog converter.

16 Claims, 8 Drawing Sheets

FIG.4 PRIOR ART

PWM POWER REGULATOR DEVICE

BACKGROUND OF THE INVENTION

1. Field of the Invention

The present invention is related to a power regulator device, and more particularly a power regulator device that adjusts voltage of a power supplied to a load according to a pulse width modulation (hereinafter PWM) signal from an external digital control circuit.

2. Description of the Related Art

The resistor is connected to a power source of a load in serial so as to adjust the voltage of the power supplied to the load. However, the resistor consumes large power for the load. When a thyristor is developed, the thyristor is applied in a power circuit of the load to adjust the voltage of the power supplied to the load. Therefore, the power consumption is wildly decreased. At present, the thyristor is commonly applied in the power circuit of a fan, a heater, an elevator, or a crane etc. equipments.

Figure 3:
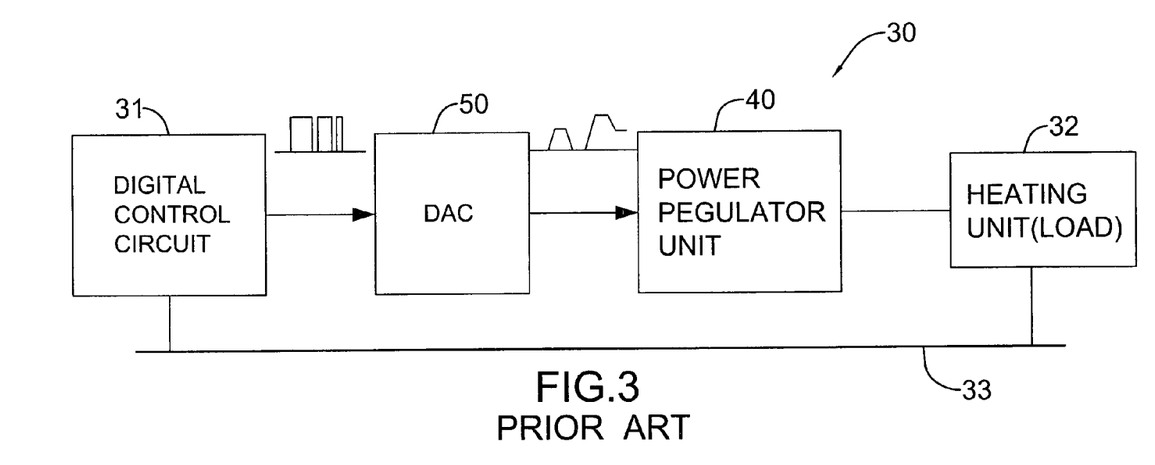
FIG. 3 is a functional block diagram of a heater in accordance with the prior art.

With reference to FIG. 3, the heater (30) has a digital control circuit (31) for adjusting heating temperature, a power regulator unit (40) and a heating unit (32). Since a voltage of a power source of the digital control circuit (31) is smaller than that of the heating unit (32), the digital control circuit (31) is connected to the power circuit of the heating unit (32) through the power regulator unit (40). The power regulator unit (40) has a thyristor, and the thyristor is connected to the power source (33) of the heating unit (32) in serial. Therefore, when the digital control circuit (31) triggers different conduct angles of the thyristor, the voltage of the power supplied to the heating unit (32) is adjusted to increase or decrease.

In general, the power regulator unit (40) is an analog circuit, so the digital control circuit (31) has to output an analog signal to trigger the thyristor. Therefore, the heater (30) requires a digital to analog converter (DAC) (50) with high cost. The DAC (50) is connected between the digital control circuit (31) and the power regulator unit (40) and precisely converts the digital signal from digital control circuit (31) to the analog signal. The analog signal triggers the thyristor. Then, the digital control circuit (31) triggers the thyristor through the DAC (50).

Figure 4:
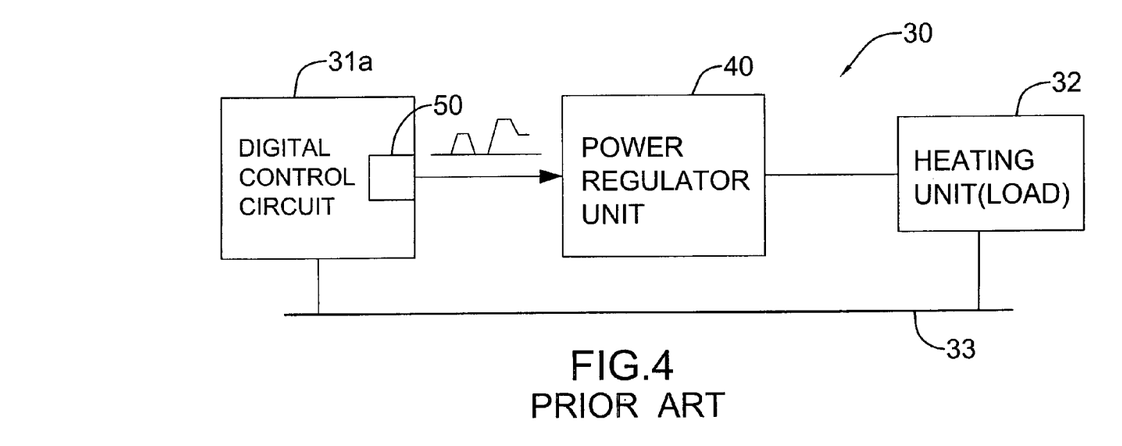
FIG. 4 is a functional block diagram of another heater in accordance with prior art.

With reference to FIG. 4, a functional diagram of another heater (30) is similar to the heater in FIG. 3, but the DAC (50) is directly designed in the digital control circuit (31a) so the control circuit (31a) outputs the analog signal to the power regulator unit (40). Therefore, the digital control circuit (31a) directly triggers the thyristor of the power regulator unit (40) to adjust the voltage of the power supplied to the heating unit (32).

Based on the foregoing description, the current equipments usually have the digital control circuits to control various functions of the equipments. The digital control circuit triggers the thyristor through the DAC. The cost of the digital control circuit will be increased.

To overcome the shortcomings, the present invention provides a PWM power regulator device to mitigate or obviate the aforementioned problems.

SUMMARY OF THE INVENTION

An objective of the present invention is to provide a PWM power regulator device that adjusts power of a load according to a pulse width modulation (hereinafter PWM) signal.

The PWM power regulator device has a processor, an input interface circuit, a zero phase detecting circuit and a thyristor. The input interface circuit is connected to a PWM output terminal of an external digital control circuit and the processor. The processor calculates a period and duty cycle of a PWM signal from the PWM output terminal and then outputs a triggering signal to the thyristor. The thyristor is triggered at different conduct angle according to the triggering signal and the triggering signal is determined by the processor according to the PWM signal. Therefore, the power regulator device is directly connected to the PWM output terminal of the digital control circuit without digital to analog converter.

Other objectives, advantages and novel features of the invention will become more apparent from the following detailed description when taken in conjunction with the accompanying drawings.

DETAILED DESCRIPTION OF THE INVENTION

Figure 2:
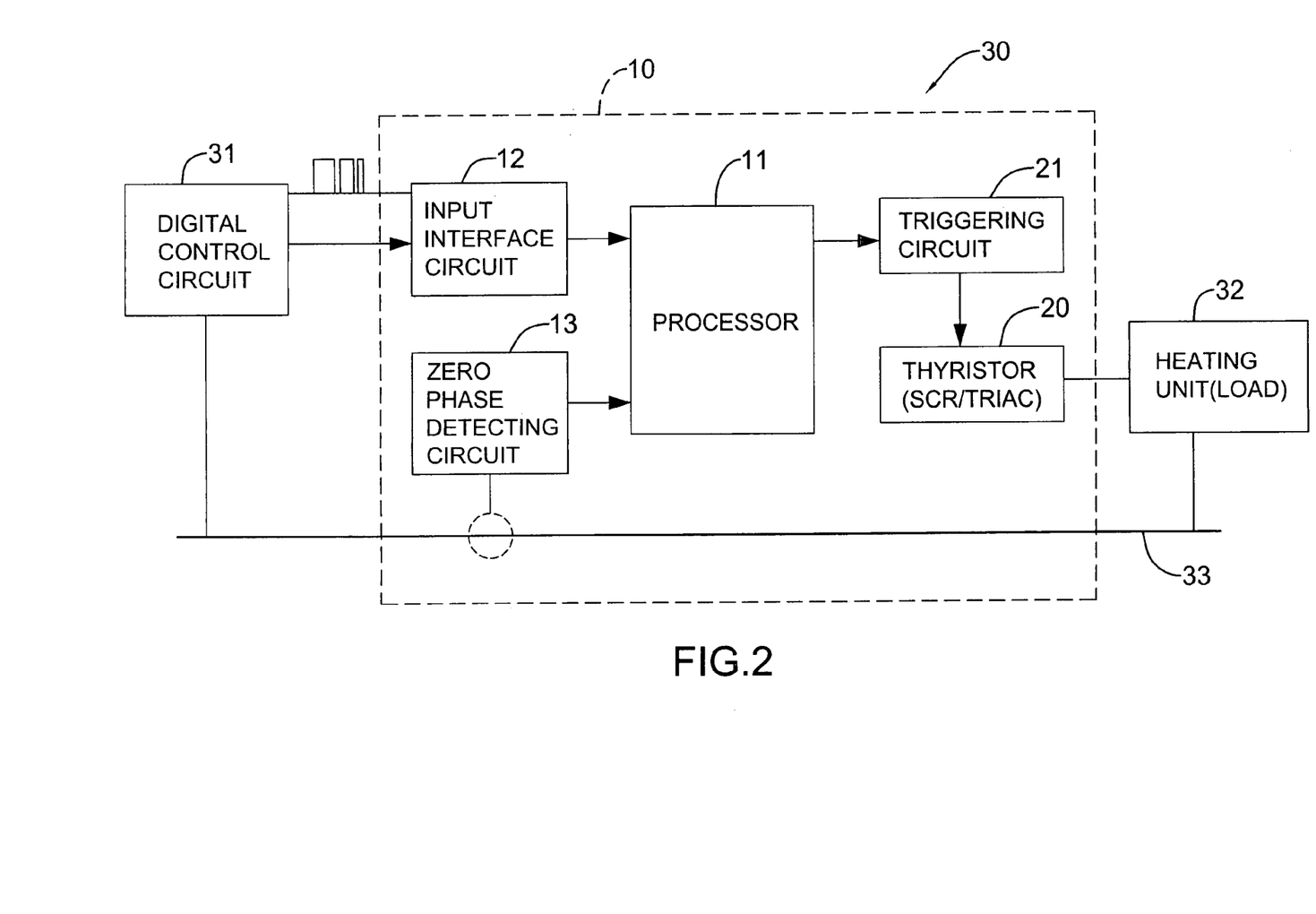
FIG. 2 is a functional block diagram of the power regulator device applied to a heater.

With reference to FIG. 2, a preferred embodiment of a PWM power regulator device (10) in accordance with the present invention is shown. The PWM power regulator device (10) has a processor (11), an input interface circuit (12), a zero phase detecting circuit (13) and a thyristor (20).

Figure 1A:
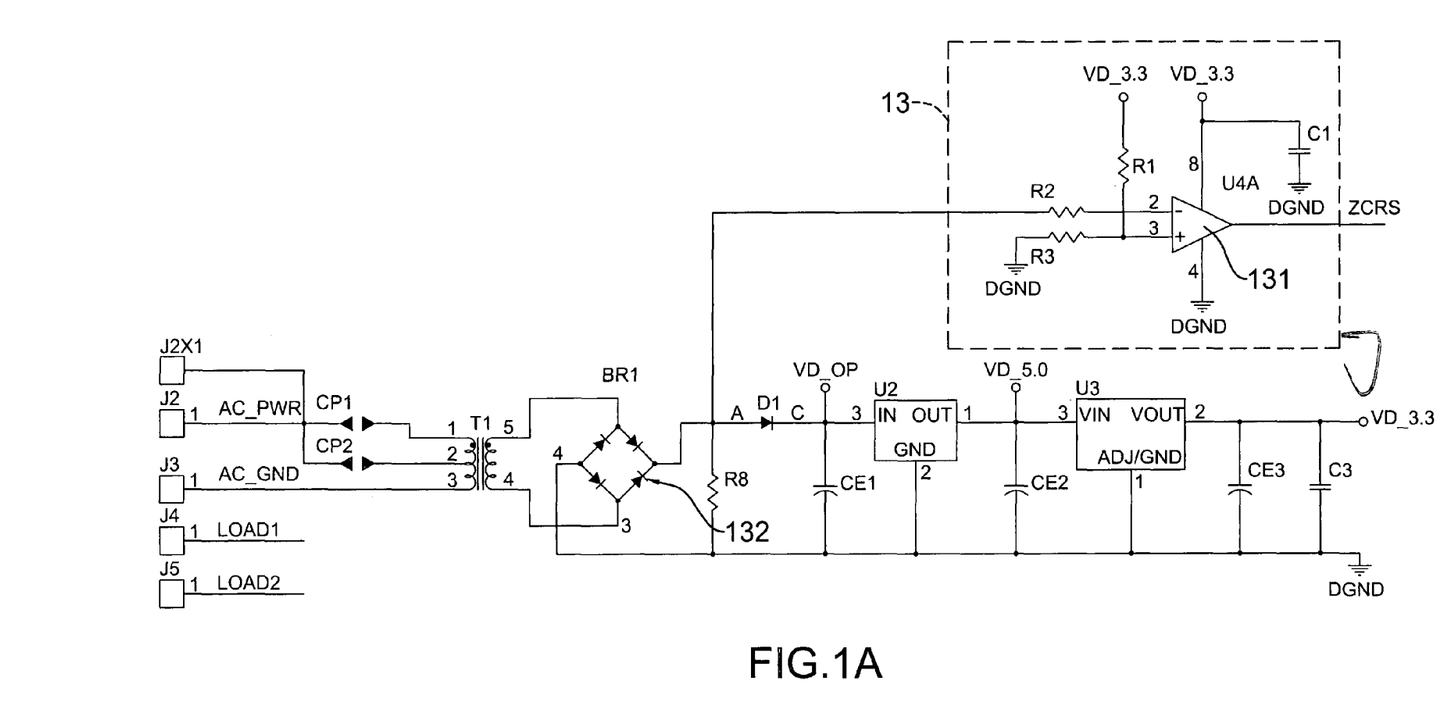
FIGS. 1A to 1F are detailed circuit diagrams of a power regulator device in accordance with the present invention.
Figure 1B:
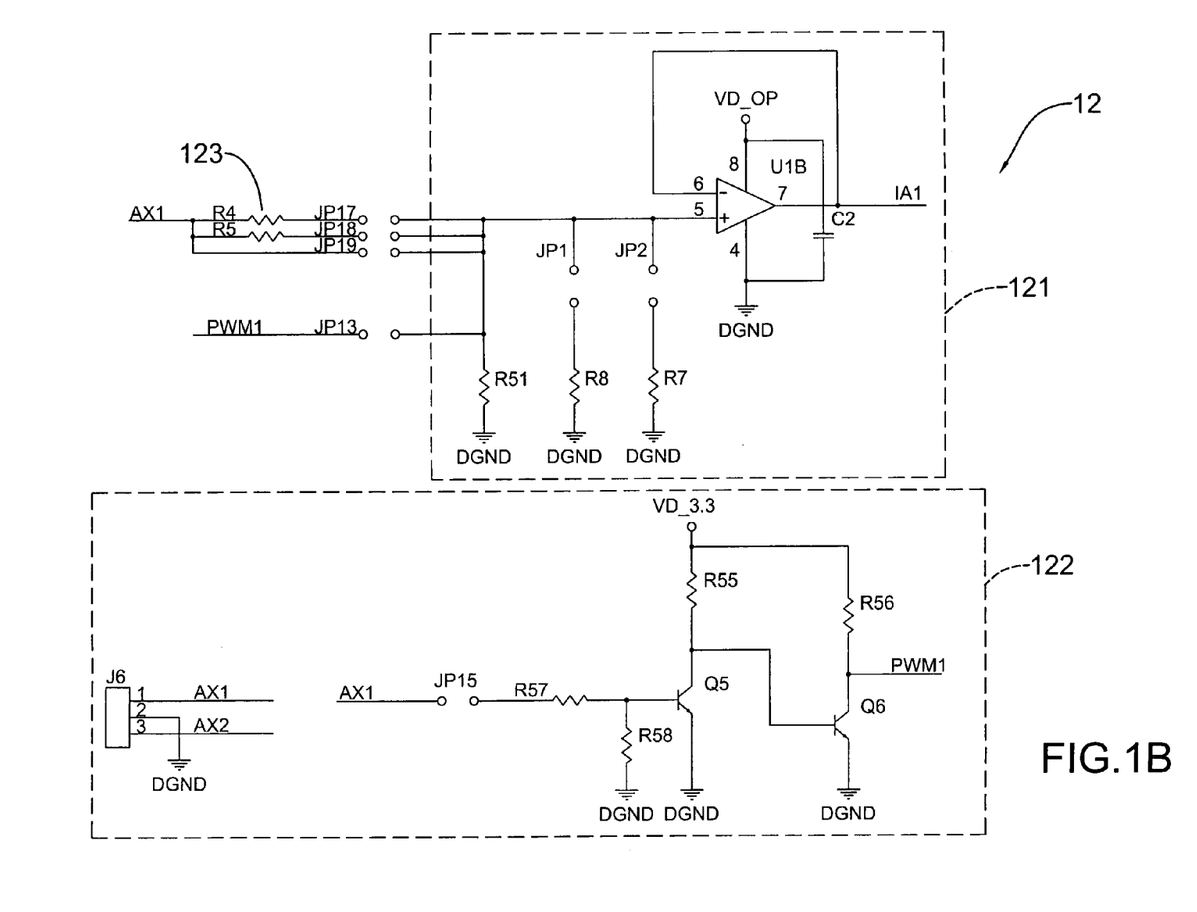
Figure 1C:
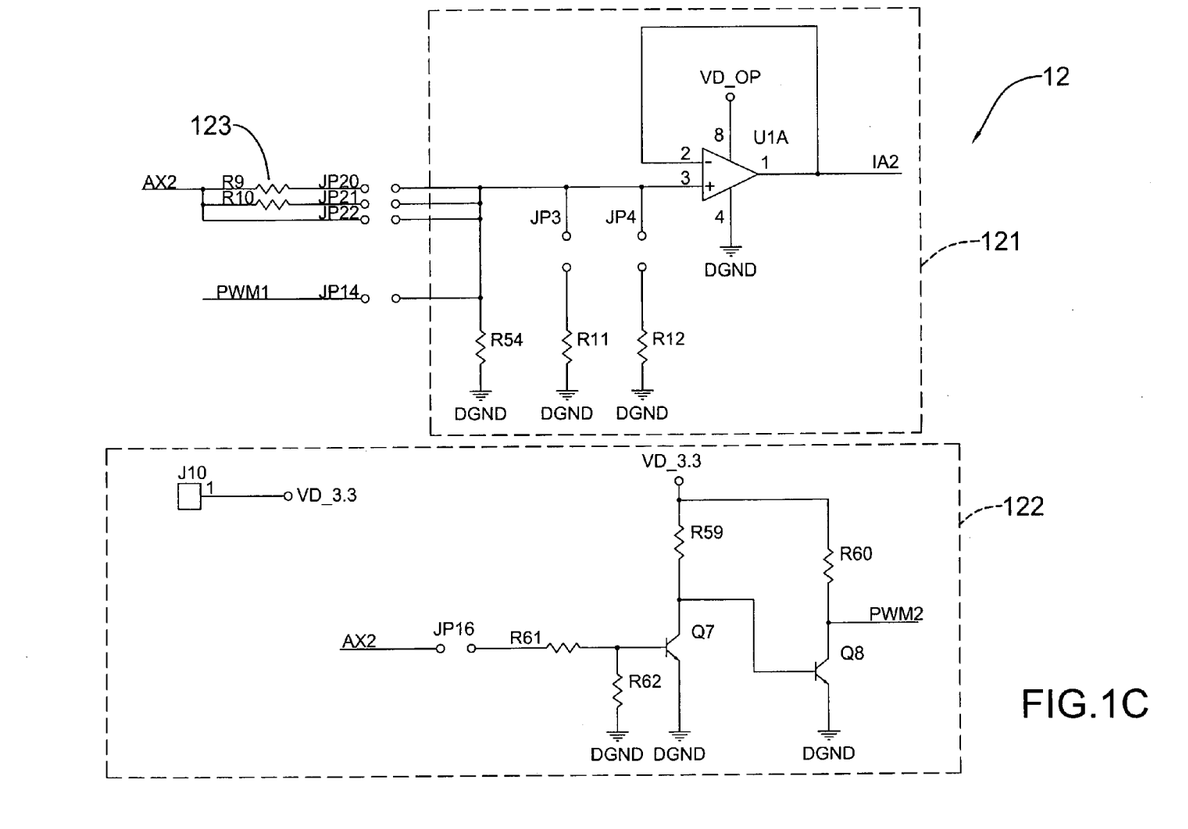
Figure 1D:
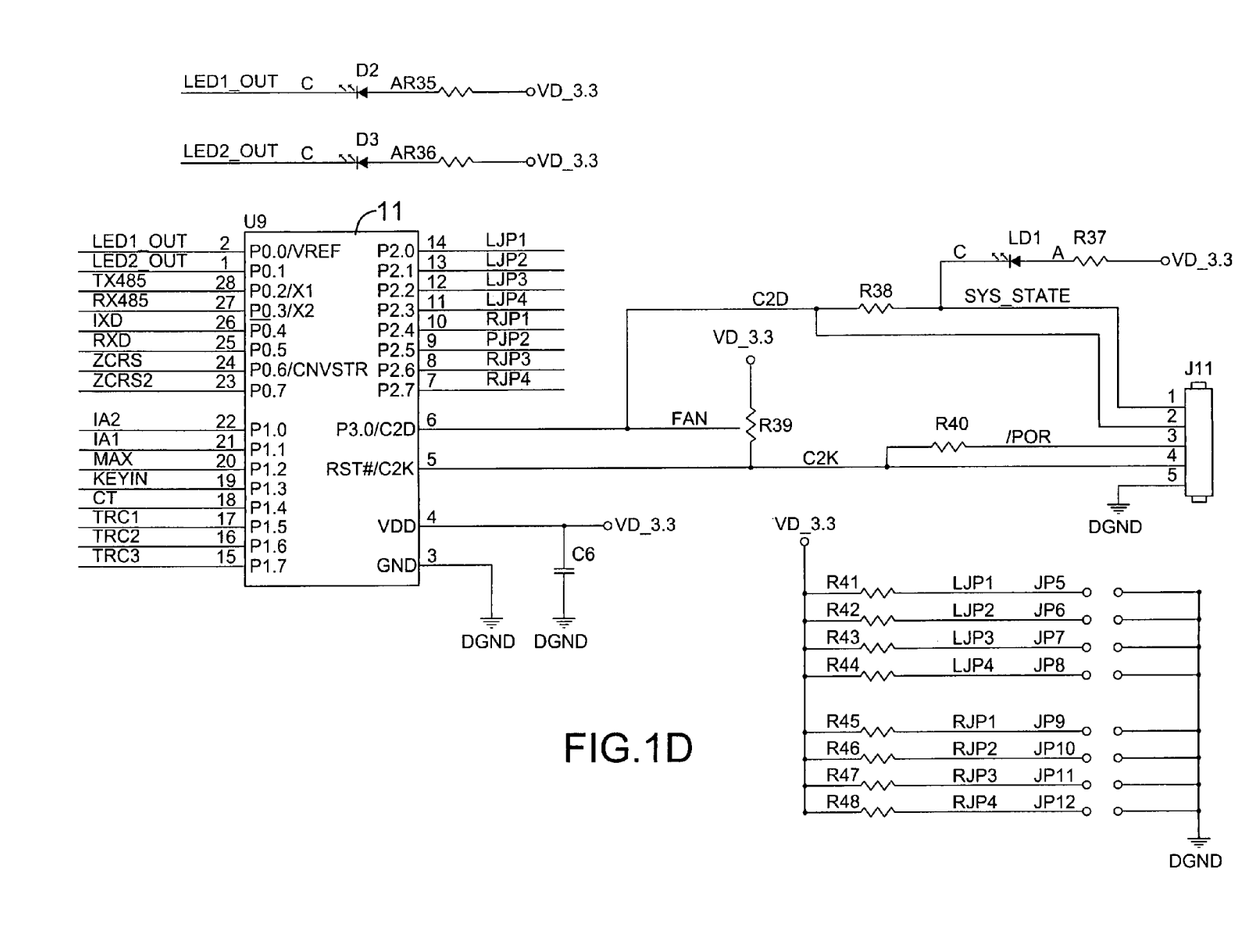

With further reference to FIG. 1D, the processor (11) has calculating and storing capabilities, inputs and outputs.

With further reference to FIG. 1B, the input interface circuit (12) is connected to the input (PIN21) of the processor (111) and a PWM output terminal (PWM1) of an external digital control circuit (31). The PWM output terminal outputs a PWM signal to the input interface circuit (12). The input interface circuit (12) converts and outputs the PWM signal to the corresponding input (PIN 21) of the processor (11). In the preferred embodiment, the input interface circuit (12) has an impedance matching circuit (121) to match an output impedance of the digital controlling circuit (31) and an input impedance of the processor (11). The impedance matching circuit (121) has a first input (PWM1) connected to the PWM output terminal (PWM1) of the digital control circuit (31) and an output (IA1) connected to the corresponding input (PIN 21) of the processor (11).

With further reference to FIG. 1A, the zero phase detecting circuit (13) is connected to the corresponding input (PIN24) of the processor (11) and coupled to an load power source (33) of an AC sin signal. The zero phase detecting circuit (13) detects and responses timings of zero phase of the load power source (33) to the processor (11). In the preferred embodiment, the zero phase detecting circuit (13) is a comparator having a first input terminal (−), a second input terminal (+) and one output terminal (ZCRS). The first input terminal (−) of the comparator is coupled to the load power source (33) of the load through a full wave rectifier (BR1). The full wave rectifier (BR1) rectifies the load power source of the AC sin signal to a full wave voltage signal. The full wave voltage signal is input to the first input terminal (−) of the comparator. The second input terminal (+) of the comparator is connected to a reference voltage signal. the output terminal (ZCRS) outputs a DC signal with voltage difference between the reference voltage signal and the full-wave voltage signal.

Since the reference voltage signal is close to zero, the voltage difference of the DC signal being close to zero will be the timing of the zero phase of the load power source (33). The processor obtains the timings of the zero phase of the load power source of the AC sin signal through the zero phase detecting circuit (13).

Figure 1E:
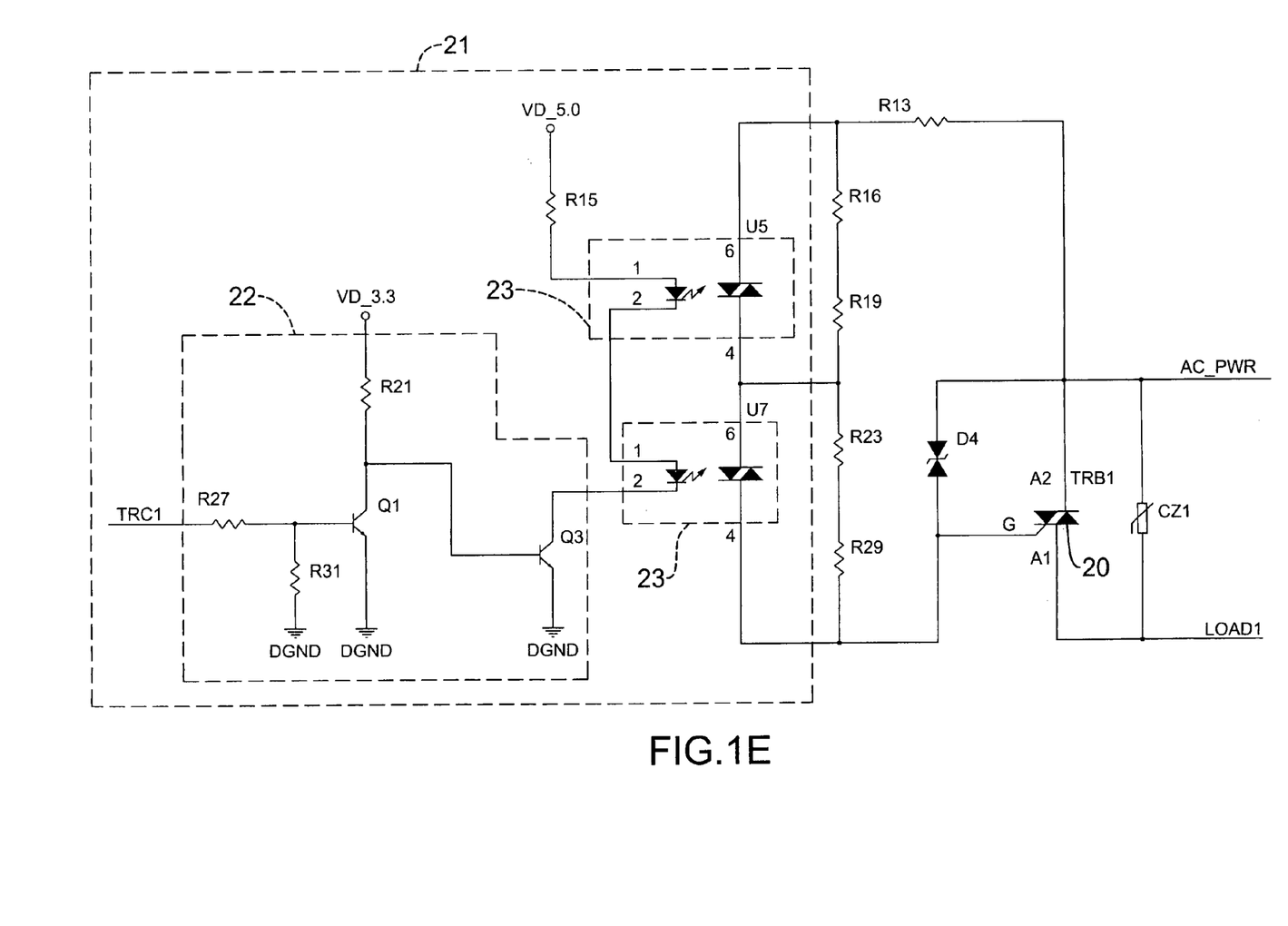

With further reference to FIG. 1E, the thyristor (20) has a triggering terminal (G) and two terminals (A1)(A2). The triggering terminal (G) is connected to the corresponding output (PIN 17) of the processor (11) through a triggering circuit (21) and the two terminals (A1)(A2) are connected to the load power source (33) in serial. The thyristor (20) may be a signal SCR, a TRIAC or two SCRs, one of which is reversely connected to the other in parallel. In preferred embodiment, the thyristor (20) is a TRIAC. Since the thyristor (20) is connected to the load power source (33) in serial, the trigger circuit (21) has a first switching circuit (22) and two photocouplers (23). The two photocouplers (20) are connected in serial and connected between the first switching circuit (22) and the triggering terminal (G) of the thyristor (20). The processor (11) outputs a triggering signal to control a conduct period of the first switching circuit (22) and then the conduct periods of the two photocouplers (23) are adjusted at the time. Therefore, a conduct period of the thyristor (20) is adjusted by the two photocouplers (23). Furthermore, the processor (11) triggers the thyristor (20) through the trigger circuit (21) and the trigger circuit (21) has two photocouplers (23), the grounds of the power source of the processor (11) and the load power source (33) are electronically separated.

With further reference to FIG. 1B, in another preferred embodiment of the present invention is applied to another digital control circuit having a digital to analog converter and an analog signal terminal. The impedance matching circuit (12) further has a second input (AX1) and/or at least one voltage divider (R4/R7)(R5/R8) and a second switching circuit (122). The second input (AX1) and/or at least one voltage divider (R4/R7)(R5/R8) are connected to the first input (PWM1) of the impedance matching circuit (12). In this preferred embodiment, there are two voltage dividers (R4/R7)(R5/R8). Since each voltage divider (R4/R7)(R5/R8) is consisted of two resistors, each resistor is connected to the jumper connector (JP17/JP2)(JP18/JP1) in serial. The second input (AX1) is connected to another jumper connector (JP19) in serial. The second switching circuit (122) is connected between the first input (PWM1) of the impedance matching circuit (121) and the second input (AX1). Two jumper connectors (JP13)(JP15) are respectively connected among the first input (PWM1), the second switching circuit (121) and the second input (AX1). Therefore, the second input (AX1) may be directly connected to the analog signal terminal or the PWM output terminal of the digital control circuit.

If the power regulator device (10) of the present invention is connected to the PWM output terminal of the digital control circuit, the two jumper connectors (JP13)(JP15) among the first input (PWM1), the second switching circuit (122) and the second input (AX1) are shorted and other jumper connectors (JP17/JP2)(JP18/JP1)(JP19) are opened. In other case, when the power regulator device (10) of the present invention is connected to the analog signal terminal of another digital control circuit, the jumper connector (JP19) of the second input (AX1) or two jumper connectors (JP17/JP2)(JP18/JP1) of one voltage divider (R4/R7)(R5/R8) are shorted. At the time, the two jumper connectors (JP13)(JP15) among the first input (PWM1), the second switching circuit (122) and the second input (AX1) are opened. Therefore, the user selects the jumper connectors to short and open, the power regulator device (10) of the present invention may be connected to the PWM output terminal or the analog signal terminal of the digital control circuit.

Figure 1F:
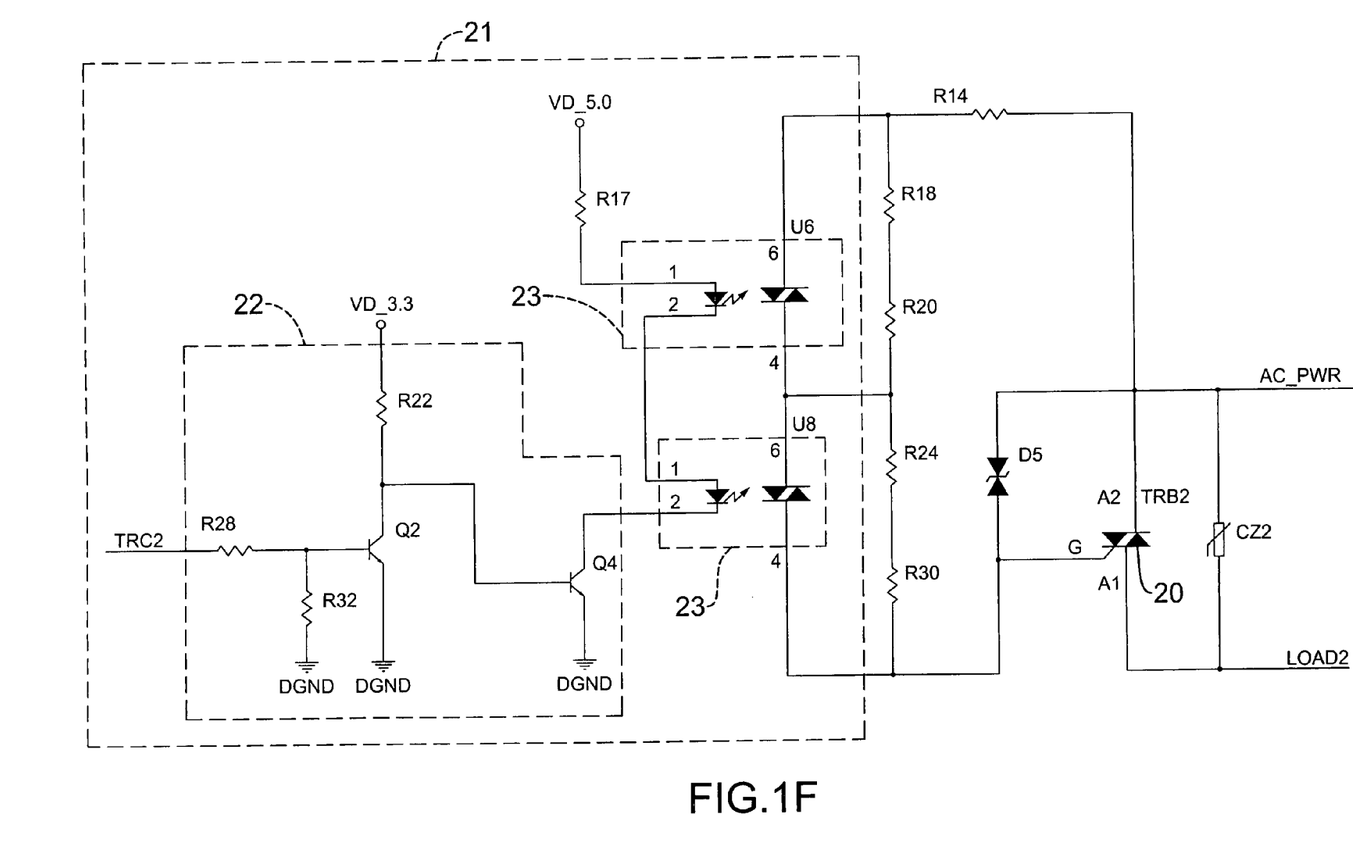

Furthermore, with reference to FIGS. 1C and 1F, the preferred embodiment of the present invention further has two input interface circuit (12) respectively connected to the corresponding inputs (PIN 21)(PIN 22) of the processor (11). Therefore, the processor (11) controls two thyristors through the corresponding triggering circuits (21). Since each impedance matching circuit (12) is consisted of an operator (U1B), two operators (U1B)(U1A) of the two impedance matching circuits (12) could be made in an integrated circuit (IC). Therefore, only operator in FIG. 1B is connected to the ground through a capacitor (C2).

With reference to FIG. 2, the power regulator device (10) of the present invention is applied to a heater (30). The heater (30) further has a digital control circuit (31) having a PWM output terminal and a heating unit (32). The power regulator device (10) is connected between the PWM output terminal and a power source (33) of the heating unit (32).

When the processor (11) receives the PWM signal through the input interface circuit (12), the processor (11) automatically calculates a period of the PWM signal from the PWM output terminal and duty cycle of the PWM signal. If the digital control circuit (31) would like to increase a heating temperature of the heating unit (32), the PWM output terminal outputs a PWM signal of high duty cycle, for example 85%. When the processor (11) receives the PWM signal of the 85% duty cycle, the processor (11) outputs two triggering signals to the corresponding triggering circuits (21) at the timing of zero phase of the power source (33) of heating unit. Each triggering signal triggers the thyristor (20) to have larger conduct angle, so the voltage of the power supplied to the heating unit (32) is increased. Therefore, the heating temperature of the heating unit (32) is increased.

Since the processor (11) triggers the thyristor (20) at the zero phase of the power source of the heating unit (32), the voltage difference of the power source of the heating unit (32) will be low. The heating unit (32) avoids that a large voltage is suddenly supplied therein. The useful life of the heating unit (32) may be increased.

On the contrary, when the digital control circuit (31) would like to decrease the heating temperature of the heating unit (32), the PWM signal of low duty cycle (45%) will be outputted to the input interface circuit (12). The processor (11) receives the PWM signal of the 45% duty cycle, and then the processor (11) outputs two triggering signals to the corresponding triggering circuits (21) at the timing of zero phase of the power source of the heating unit (32). Each triggering signal triggers the thyristor (20) to have smaller conduct angle, so the voltage of the power supplied to the heating unit (32) is decreased. Therefore, the heating temperature is decreased.

Based on the foregoing description, the power regulator device in accordance with the present invention is directly connected to the PWM output terminal of the digital control circuit without a digital to analog converter. The digital control circuit easily adjusts the voltage of the power supplied to the equipment. Furthermore, the zero phase detecting circuit provides timings of zero phase of the power source of the equipment to the processor, so the processor triggers the thyristor at low voltage status of the power source of the equipment and the useful life could be increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A PWM power regulator device comprising:
    a processor having calculating and storing capabilities, inputs and outputs;
    an input interface circuit connected to the input of processor and adapted to connect to an PWM output terminal of an external digital control circuit to receive PWM signal;
    a zero phase detecting circuit connected to the input of the processor and adapted to couple to a load power source of an AC sin signal, and detecting timings of zero phase of the load power source to the processor; and
    at least one thyristor having
        a triggering terminal connected to the output of the processor and triggered by the processor; and
        two terminals adapted to connect to load power source in serial;
    whereby the processor triggers the thyristor at different conduct angle according to a duty cycle of the PWM signal and the timing of zero phase of the load power source.

2. The PWM power regulator device as claimed in claim 1, wherein the zero phase detecting circuit comprises:
    a full wave rectifier adapted to connect the load power source of the AC sin signal, and rectifying the load power source of the AC sin signal to a full-wave voltage signal; and
    a comparator having:
        a first input terminal connected to the full wave rectifier to receive the full-wave voltage signal;
        a second input terminal connected to a reference voltage signal; and
        an output terminal connected to the output of the processor and outputting a DC signal with voltage difference between the reference voltage signal and the full-wave voltage signal.

3. The PWM power regulator device as claimed in claim 1, further comprising at least one triggering circuit, the at least one triggering circuit connected between the corresponding output of the processor and the corresponding triggering terminal of the thyristor, and each of the at least one triggering circuit comprising:
    a first switching circuit connected between the corresponding output of the processor; and
    two photocouplers connected in serial and connected between the first switching circuit and the corresponding triggering terminal of the thyristor.

4. The PWM power regulator device as claimed in claim 2, further comprising at least one triggering circuit, the at least one triggering circuit connected between the corresponding output of the processor and the corresponding triggering terminal of the thyristor, and each of the at least one triggering circuit comprising:
    a first switching circuit connected between the corresponding output of the processor; and
    two photocouplers connected in serial and connected between the first switching circuit and the corresponding triggering terminal of the thyristor.

5. The PWM power regulator device as claimed in claim 3, wherein the input interface circuit has an impedance matching circuit having:
    a first input adapted to connect to the PWM output terminal; and
    an output connected to the input of the processor.

6. The PWM power regulator device as claimed in claim 4, wherein the input interface circuit has an impedance matching circuit having:
    a first input adapted to connect to the PWM output terminal; and
    an output connected to the input of the processor.

7. The PWM power regulator device as claimed in claim 5, wherein the impedance matching circuit further comprises:
    a second input adapted to connect to an analog signal terminal of another digital control circuit and connected to the first input through a first jumper connector;
    at least one voltage divider connect to the first input through the two second jumper connectors; and
    a second switching circuit connected between the first input and the second input through the two third jumper connectors.

8. The PWM power regulator device as claimed in claim 6, wherein the impedance matching circuit further comprises:
    a second input adapted to connect to an analog signal terminal of another digital control circuit and connected to the first input through a first jumper connector;
    at least one voltage divider connect to the first input through the two second jumper connectors; and
    a second switching circuit connected between the first input and the second input through the two third jumper connectors.

9. The PWM power regulator device as claimed in claim 1, wherein the thyristor is a signal SCR, a TRIAC or two SCRs one of which is reversely connected to the other in parallel.

10. The PWM power regulator device as claimed in claim 2, wherein the thyristor is a signal SCR, a TRIAC or two SCRs one of which is reversely connected to the other in parallel.

11. The PWM power regulator device as claimed in claim 3, wherein the thyristor is a signal SCR, a TRIAC or two SCRs one of which is reversely connected to the other in parallel.

12. The PWM power regulator device as claimed in claim 4, wherein the thyristor is a signal SCR, a TRIAC or two SCRs one of which is reversely connected to the other in parallel.

13. The PWM power regulator device as claimed in claim 5, wherein the thyristor is a signal SCR, a TRIAC or two SCRs one of which is reversely connected to the other in parallel.

14. The PWM power regulator device as claimed in claim 6, wherein the thyristor is a signal SCR, a TRIAC or two SCRs one of which is reversely connected to the other in parallel.

15. The PWM power regulator device as claimed in claim 7, wherein the thyristor is a signal SCR, a TRIAC or two SCRs one of which is reversely connected to the other in parallel.

16. The PWM power regulator device as claimed in claim 8, wherein the thyristor is a signal SCR, a TRIAC or two SCRs one of which is reversely connected to the other in parallel.

* * * * *